No. 856,783. PATENTED JUNE 11, 1907.
J. B. KETCHUM.
KODAK FILM.
APPLICATION FILED NOV. 14, 1905.

WITNESSES

INVENTOR
Jesse B. Ketchum
BY
ATTORNEYS

UNITED STATES PATENT OFFICE.

JESSE BEVERLY KETCHUM, OF JOPLIN, MISSOURI.

KODAK-FILM.

No. 856,783.  Specification of Letters Patent.  Patented June 11, 1907.

Application filed November 14, 1905. Serial No. 287,254.

*To all whom it may concern:*

Be it known that I, JESSE BEVERLY KETCHUM, a citizen of the United States, and a resident of Joplin, in the county of Jasper and State of Missouri, have invented a new and Improved Kodak-Film, of which the following is a full, clear, and exact description.

This invention relates to kodak films, and particularly to that class of films which are formed in a continuous web to be advanced after each exposure.

The film is intended to be used in a camera having a ground glass focusing plate across which the film is passed. An opening is provided in the film or its web, which may be brought into position over the ground glass; in this way one is enabled to focus an image on the ground glass without removing the film from the camera.

The object of this invention is to improve the construction of a film of the class described and particularly to increase its durability with the purpose of preventing tearing the edges of the focusing opening.

The invention consists in the construction to be described more fully hereinafter and particularly set forth in the claims.

Figure 1:
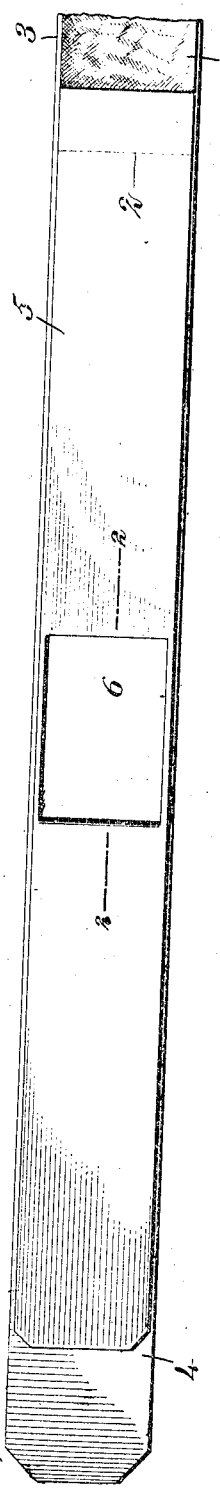
Figure 2:
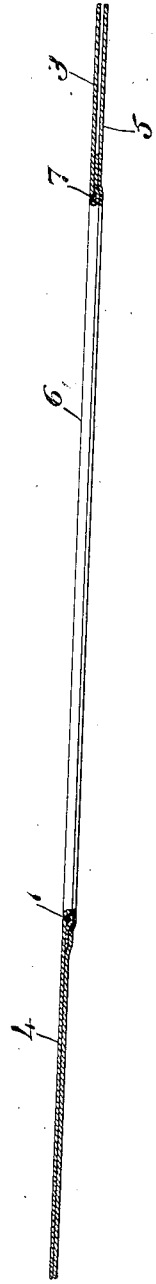

Figure 1 is a side view of a film constructed according to my invention; Fig. 2 is a longitudinal section through a portion of the film and taken on the line 2—2 of Fig. 1.

Referring more particularly to the parts, 1 represents the end portion of the film which terminates at the line 2. On the rear side of this film there is placed a web 3 which extends continuously with the film and protects its rear side from the light at the peep opening of the camera. The end portion 4 of this web projects well beyond the end of the film as shown and I strengthen this point by a reinforcing piece 5 attached on the forward face of the web, overlapping the film and attached thereto with a suitable adhesive.

In the web and reinforcing piece beyond the film an opening 6 is provided which is of rectangular form as shown and of about the same dimensions as the plate or photograph made with the camera. The edges of this opening are reinforced by strips or binders about which the edges of the web are folded as shown in Fig. 2.

From this arrangement, when the web and film are moved back and forth to bring the opening 6 over the ground glass in focusing, the edges will not tear for they are reinforced by the strips 7..

Having described my invention what I claim and desire to secure by Letters-Patent is:

A film for a kodak having a web with a focusing opening therein and binding strips at the edge of said opening reinforcing the same.

In testimony whereof I have signed my name to this specification in the presence of two subscribing witnesses.

JESSE BEVERLY KETCHUM.

Witnesses:
 W. N. STOKES,
 W. W. GILBERT.